United States Patent
Nibe

(10) Patent No.: US 8,903,331 B2
(45) Date of Patent: Dec. 2, 2014

(54) RADIO COMMUNICATION APPARATUS, BASEBAND PROCESSING APPARATUS, AND RADIO APPARATUS

(71) Applicant: Fujitsu Limited, Kawasaki-shi, Kanagawa (JP)

(72) Inventor: Keiji Nibe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 13/778,834

(22) Filed: Feb. 27, 2013

(65) Prior Publication Data

US 2013/0170527 A1     Jul. 4, 2013

Related U.S. Application Data

(63) Continuation of application No. PCT/JP2010/065423, filed on Sep. 8, 2010.

(51) Int. Cl.
| | |
|---|---|
| H04B 1/38 | (2006.01) |
| H04B 15/00 | (2006.01) |
| H04L 25/02 | (2006.01) |
| H04L 1/08 | (2006.01) |
| H04L 1/18 | (2006.01) |
| H04W 52/32 | (2009.01) |
| H04L 1/00 | (2006.01) |
| H04W 52/08 | (2009.01) |

(52) U.S. Cl.
CPC ....... *H04L 25/02* (2013.01); *H04L 1/08* (2013.01); *H04L 1/189* (2013.01); *H04W 52/325* (2013.01); *H04L 2001/0098* (2013.01); *H04W 52/08* (2013.01); *Y10S 370/913* (2013.01)
USPC .............. 455/73; 455/522; 370/252; 370/913

(58) Field of Classification Search
USPC ............. 455/73, 522; 370/252, 310, 912, 913
See application file for complete search history.

(56) References Cited

U.S. PATENT DOCUMENTS

| | | | | |
|---|---|---|---|---|
| 6,873,831 | B2 * | 3/2005 | Attar et al. | 455/126 |
| 7,127,260 | B1 * | 10/2006 | Kim et al. | 455/456.4 |
| 7,184,707 | B2 * | 2/2007 | Tada et al. | 455/455 |
| 7,486,638 | B2 * | 2/2009 | Ofuji et al. | 370/329 |
| 2009/0061787 | A1 | 3/2009 | Koller et al. | |

FOREIGN PATENT DOCUMENTS

| | | |
|---|---|---|
| JP | 2009-105881 | 5/2009 |
| WO | WO 2006/102922 | 10/2006 |

OTHER PUBLICATIONS

Patent Abstracts of Japan, Publication No. 2009-105881, Published May 14, 2009.
International Search Report of PCT/JP2010/065423 mailed Nov. 2, 2010.

* cited by examiner

*Primary Examiner* — Quochien B Vuong
(74) *Attorney, Agent, or Firm* — Staas & Halsey LLP

(57) ABSTRACT

A radio communication apparatus includes a baseband processing unit and a radio unit. The baseband processing unit transmits, to the radio unit, first data indicating a plurality of candidates for instructions corresponding to a plurality of values to be taken by the control information before obtaining the control information on radio communication. Furthermore, the baseband processing unit transmits, to the radio unit, second data for identifying the instruction corresponding to the value of the obtained control information of the plurality of candidates for instructions, after obtaining the control information. The radio unit performs processing in accordance with the instruction identified by the received second data of the plurality of candidates for instructions indicated by the received first data.

7 Claims, 12 Drawing Sheets

RADIO COMMUNICATION APPARATUS, BASEBAND PROCESSING APPARATUS, AND RADIO APPARATUS

CROSS-REFERENCE TO RELATED APPLICATION

This application is a continuation application of International Application PCT/JP2010/065423 filed on Sep. 8, 2010 and designated the U.S., the entire contents of which are incorporated herein by reference.

FIELD

The embodiments discussed herein relate to a radio communication apparatus, a baseband processing apparatus, and a radio apparatus.

BACKGROUND

At present, radio communication systems such as mobile phone systems and wireless LANs (Local Area Networks) are widely used. Many radio communication apparatuses each include a radio unit (RF unit) that performs radio signal processing, and a baseband processing unit (BB unit) that performs baseband signal processing. The radio unit and the baseband processing unit each may be made into chips as an RFIC (Integrated Circuit) and a BBIC, and both may be used by being connected by a signal line.

Here, the RFIC and the BBIC may be connected by a digital signal line. There is DigRF as a digital interface standard between the RFIC and the BBIC. DigRF specifications are discussed in a working group in the MIPI (Mobile Industry Processor Interface) Alliance. According to the DigRF, a BBIC packetizes I/Q (In-phase/Quadrature) data to transmit and control data used for control of an RFIC, and transmits the packetized data to the RFIC. Furthermore, the RFIC packetizes the received I/Q data, and transmits the packetized data to the BBIC.

Note that, with respect to the DigRF, a radio communication apparatus is proposed in which a BBIC preliminarily transmits, to an RFIC, transmission information indicating timing schedule for a transmission burst, and the RFIC controls the transmission of the transmission burst autonomously (for example, see, International Publication Pamphlet No. WO2006/102922). Furthermore, a radio communication apparatus is proposed in which a plurality of setting patterns is preliminarily stored inside an RF transceiver, and the RF transceiver selects a corresponding setting pattern and applies the setting pattern to a sub-circuit when a baseband device requests a specific operation mode from an RF device (for example, see, paragraphs [0024] and [0025] in Japanese Laid-open Patent Publication No. 2009-105881).

Meanwhile, it is contemplated that a radio unit and a baseband processing unit, when transmitting and receiving control data in a packet format, performs retransmission control. That is, it is contemplated that the radio unit performs the error detection on the control data of the packet format received from the baseband processing unit, requests retransmission from the baseband processing unit when an error is found, and performs processing based on the control data when an error is not found. However, when retransmission control is performed on control data, a delay accompanying retransmission may become a problem, depending on a content of processing performed by the radio unit.

For example, there may also be a case where when the radio communication apparatus obtains control information (for example, information on transmission power control) on radio communication from another radio communication apparatus of a communication partner, it is required that the radio communication apparatus performs, within a predetermined time from obtaining the control information, processing (for example, change in transmission power of the radio unit) in accordance with the control information. However, when the baseband processing unit generates control data after obtaining the control information and transmits the control data to the radio unit, and the retransmission of the control data occurs, there is also a possibility that the radio unit is not able to perform the processing within the predetermined time from obtaining the control information.

SUMMARY

According to an aspect of the embodiments, there is provided a radio communication apparatus which includes: a radio unit; and a baseband processing unit that obtains control information on radio communication, and instructs the radio unit to perform processing in accordance with the control information, wherein the baseband processing unit includes: a first control unit that generates first data indicating a plurality of candidates for instructions corresponding to a plurality of values to be taken by the control information, and generates second data for identifying the instruction corresponding to the value of the obtained control information, of the plurality of candidates for instructions; and a transmission unit that transmits the first data to the radio unit before obtaining the control data, and transmits the second data to the radio unit after obtaining the control information, and wherein the radio unit includes: a reception unit that receives the first and second data from the baseband processing unit; and a second control unit that performs processing in accordance with the instruction identified by the received second data, of the plurality of candidates for instructions indicated by the received first data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The present embodiments will be described below with reference to the drawings.

[First Embodiment]

Figure 1:
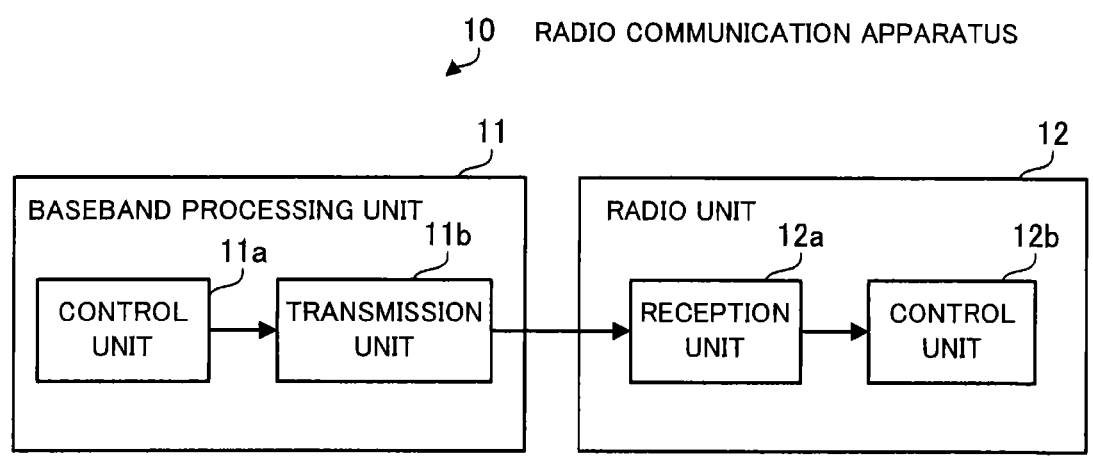
FIG. 1 illustrates a radio communication apparatus of a first embodiment.

FIG. 1 illustrates a radio communication apparatus of a first embodiment. A radio communication apparatus 10 of the first embodiment performs radio communication with anther radio communication apparatus (not illustrated). The radio communication apparatus 10 may be a mobile station such as, for example, a mobile phone or a base station.

The radio communication apparatus 10 includes a baseband processing unit 11 and a radio unit 12. The baseband processing unit 11 and the radio unit 12 may be connected by a digital signal line. For example, both of them packetize various data, and transmit and receive the packetized data in accordance with DigRF specifications.

The baseband processing unit 11 obtains control information on radio communication, and instructs the radio unit 12 to perform processing in accordance with the control information. The control information may be control information received from another radio communication apparatus via the radio unit 12. A Transmission Power Control (TPC) bit, for example, is considered as control information. The radio unit 12 performs processing in accordance with an instruction from the baseband processing unit 11. A change in transmission power, for example, is considered as a processing content.

The baseband processing unit 11 includes a control unit 11a and a transmission unit 11b.

The control unit 11a generates first data indicating a plurality of candidates for instructions corresponding to a plurality of values to be taken by control information before obtaining the control information. At this time, the control unit 11a may: calculate state candidates after change from the current state of the radio unit 12 and the plurality of values to be taken by the control information; and generate candidates for instructions to change the state. For example, it is contemplated to: calculate candidates for transmission power after change from the current transmission power and candidates for TPC bits; and generate candidates for instructions to change the transmission power. Furthermore, the control unit 11a generates second data for identifying the instruction corresponding to the value of the obtained control information, of the plurality of candidates for instructions, after obtaining the control information.

The transmission unit 11b transmits the first data to the radio unit 12, before obtaining the control information. The first data may be transmitted as data on which retransmission control is performed. It is preferred to complete the transmission and reception of the first data including retransmission control before obtaining the control information. The transmission of the first data is started, for example, before a predetermined time from a timing at which the control information will be obtained. Furthermore, the transmission unit 11b transmits the second data to the radio unit 12, after obtaining the control information. The second data may be transmitted as data on which retransmission control is not performed. The transmission unit 11b transmits the second data a plurality of times to the radio unit 12 without waiting for a retransmission request from the radio unit 12, for example.

The radio unit 12 includes a reception unit 12a and a control unit 12b.

The reception unit 12a receives the first data from the baseband processing unit 11 before obtaining the control information. The reception unit 12a may perform retransmission control on the first data. That is, the reception unit 12a may perform the error detection on the received first data, and may request the baseband processing unit 11 to retransmit the first data when an error is found. Furthermore, the reception unit 12a receives the second data from the baseband processing unit 11 after obtaining the control information. It is preferred that the reception unit 12a does not perform retransmission control on the second data. When the second data is transmitted a plurality of times, at least one the second data may be received without any error.

The control unit 12b holds the received first data temporarily. For example, the control unit 12b stores the first data in a storage device such as a memory that the control unit 12b has. Then, the control unit 12b selects the instruction identified by the received second data, of the plurality of candidates for instructions indicated by the first data, and performs processing. For example, the control unit 12b changes the setting of a power amplifier so as to become the transmission power indicated by the selected instruction.

According to such a radio communication apparatus 10, the baseband processing unit 11 transmits, to the radio unit 12, first data indicating a plurality of candidates for instructions corresponding to a plurality of values to be taken by control information before obtaining the control information on radio communication. Furthermore, the baseband processing unit 11 transmits, to the radio unit 12, second data for identifying the instruction corresponding to the value of the obtained control information, of the plurality of candidates for instructions, after obtaining the control information. The radio unit 12 performs processing in accordance with the instruction identified by the received second data, of the plurality of candidates for instructions indicated by the received first data.

Hence, the first data indicating the content of the instruction starts to be transmitted from the baseband processing unit 11 to the radio unit 12 before the control information is obtained, and even when the retransmission of the first data occurs, the effect on processing after obtaining the control information is mitigated. That is, the delay from when the control information on radio communication is obtained in the baseband processing unit 11, until processing in accordance with the control information is performed in the radio unit 12 is suppressed. Particularly, the possibility of occurrence of delay is suppressed by transmitting the second data generated after obtaining the control information, from the baseband processing unit 11 to the radio unit 12 by a method in which retransmission control is not performed.

Note that, the baseband processing unit 11 and the radio unit 12 are also distributed respectively in a state of being incorporated into the radio communication apparatus 10, or are also distributed as independent parts. Furthermore, the baseband processing unit 11 and the radio unit 12 are utilized in various types of radio communication systems. An example of a mobile communication system of a W-CDMA (Wideband Code Division Multiple Access) system is cited in a second embodiment described below.

[Second Embodiment]

Figure 2:
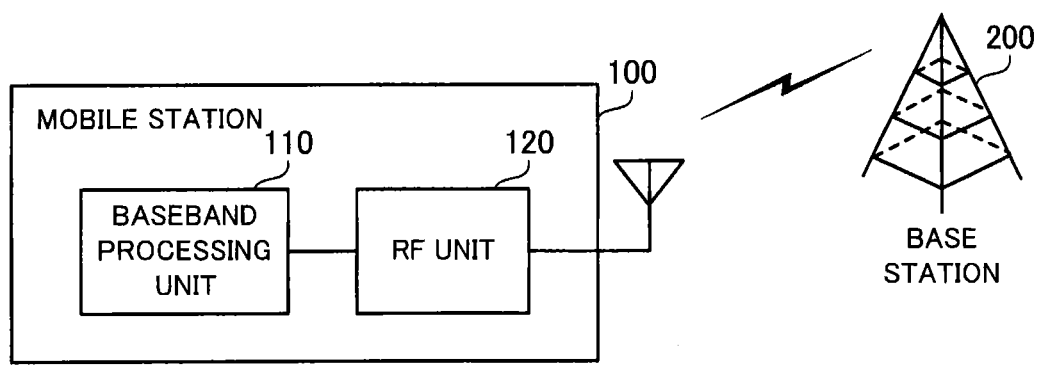
FIG. 2 illustrates a mobile communication system of a second embodiment.

FIG. 2 illustrates a mobile communication system of the second embodiment. The mobile communication system of the second embodiment includes a mobile station 100 and a base station 200.

The mobile station 100 is a radio terminal device that accesses the base station 200 and performs radio communication. The mobile station 100 is, for example, a mobile phone or a portable information terminal device. The mobile station 100 receives user data and control information on radio communication from the base station 200 on a downlink (DL), and transmits user data and control information to the base station 200 on an uplink (UL). A TPC bit indicating an increase or decrease in transmission power is included in control information that the mobile station 100 receives. The TPC bit is transmitted on a Dedicated Physical Channel (DPCH) on the downlink. The mobile station 100 increases or decreases transmission power by a predetermined width (for example, 1 dB) in accordance with the value ("Up" or "Down") of the TPC bit.

The base station 200 is a radio communication apparatus that performs radio communication between the base station 200 and the mobile station 100. The base station 200 is connected to a wired upper network (not illustrated), and transfers user data between the upper network and the mobile station 100. Furthermore, the base station 200 transmits and receives control information, and controls radio communication between the base station 200 and the mobile station 100. For example, the base station 200 measures radio quality such as a Signal to Interference Ratio (SIR), and compares the radio quality with a target value. The base station 200 transmits a TPC bit indicating the increase of transmission power when the measured value is lower than the target value, and transmits a TPC bit indicating the decrease of transmission power when the measured value is higher than the target value.

Here, the mobile station 100 includes a baseband processing unit 110 and an RF unit 120. The baseband processing unit 110 and the RF unit 120 are made into chips as a BBIC and an RFIC, respectively. The baseband processing unit 110 and the RF unit 120 are connected by a digital signal line, packetize I/Q data and control data based on a DigRF standard (for example, DigRF version 4), and transmit and receive the packetized data. In packet communication, retransmission control may be performed.

The baseband processing unit 110 processes a baseband signal. In baseband signal processing, processing that encodes and modulates user data and control information to generate I/Q data, and processing that demodulates and decodes received I/Q data to extract user data and control information are included. Furthermore, the baseband processing unit 110 generates control data used for the control of the RF unit 120. For example, the baseband processing unit 110 generates control data indicating transmission power after change from a TPC bit.

The RF unit 120 processes a radio signal. In radio signal processing, processing that A/D (Analog to Digital)-converts a received signal to extract I/Q data, and processing that D/A (Digital to Analog)-converts I/Q data to generate a transmission signal are included. Furthermore, the radio unit 120 performs processing in accordance with control data received from the baseband processing unit 110. For example, the radio unit 120 controls a power amplifier (not illustrated in FIG. 2) so as to obtain transmission power that control data indicates. Note that, in W-CDMA standards, it is defined that a mobile station reflects a TPC bit in transmission power on the UL after 1024 chips from the head of a DPCH in which the TPC bit is included.

Figure 3:
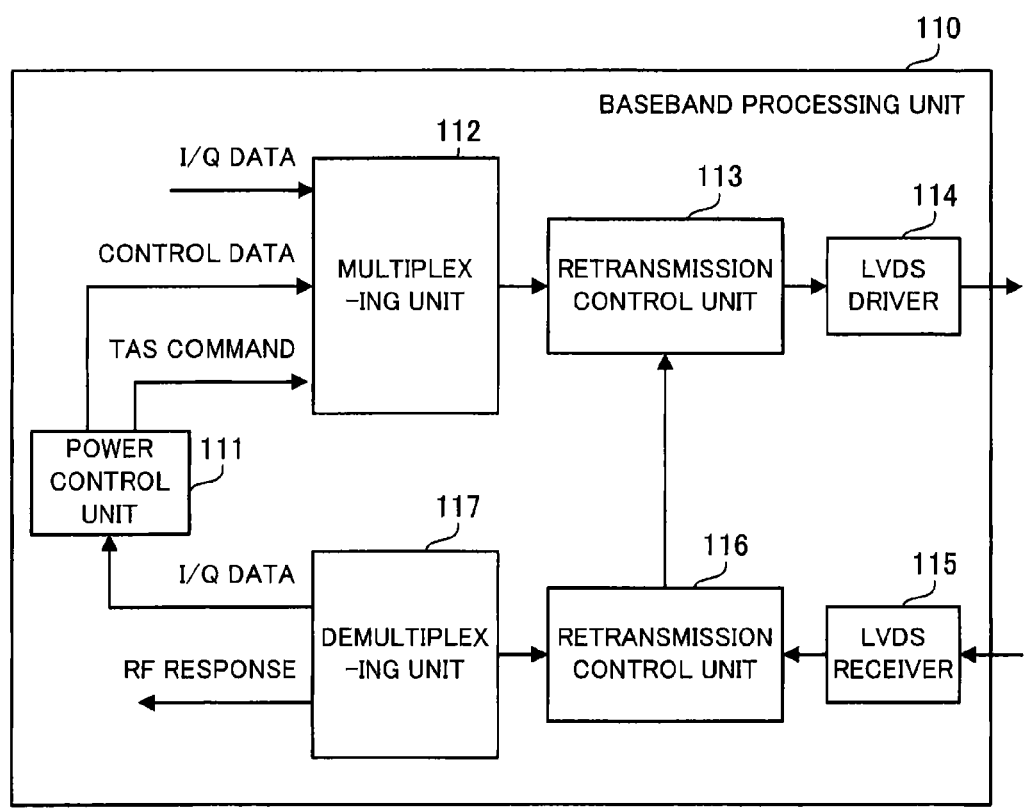
FIG. 3 is a block diagram illustrating a baseband processing unit of a mobile station.

FIG. 3 is a block diagram illustrating a baseband processing unit of a mobile station. The baseband processing unit 110 includes a power control unit 111, a multiplexing unit 112, retransmission control units 113 and 116, an LVDS (Low Voltage Differential Signaling) driver 114, an LVDS receiver 115, and a demultiplexing unit 117.

The power control unit 111 controls the transmission power of the mobile station 100 based on the TPC bit. Specifically, the power control unit 111 calculates, from the current transmission power before obtaining the TPC bit, transmission power after change in the case where the TPC bit is "Up" and transmission power after change in the case where the TPC bit is "Down". Then, the power control unit 111 generates control data indicating the two calculated candidates for transmission power, and outputs the control data to the multiplexing unit 112.

Furthermore, the power control unit 111, when obtaining the TPC bit from the demultiplexing unit 117, determines which of "Up" or "Down" the TPC bit indicates. Then, the power control unit 111 generates a TAS (Timing Accurate Strobe) command indicating the determination result of the TPC bit, and outputs the TAS command to the multiplexing unit 112. The TAS command requests, from the RF unit 120, the execution of processing indicated by control data that has been already transmitted, and, in other words, indicates which of two candidates for transmission power calculated in advance is applied. The TAS command is represented by, for example, one bit.

The multiplexing unit 112 obtains the I/Q data, control data, and TAS command generated in the baseband processing unit 110, and adjusts transmission timing. That is, the multiplexing unit 112 time-division multiplexes the I/Q data, control data, and a TAS command, and outputs the resultant to the retransmission control unit 113.

The retransmission control unit 113 performs retransmission control of data to be transmitted to the RF unit 120 in cooperation with the retransmission control unit 116. That is, the retransmission control unit 113 outputs data obtained from the multiplexing unit 112 to the LVDS driver 114, and also stores the data in a buffer temporarily. Subsequently, the retransmission control unit 113, when notified of a retransmission request from the retransmission control unit 116, outputs the data stored in the buffer to the LVDS driver 114. In contrast, the retransmission control unit 113, when not notified of a retransmission request, processes the next data obtained from the multiplexing unit 112. However, the retransmission control unit 113 does not perform retransmission control on the TAS command, and outputs the same TAS command continuously a plurality of times (for example, twice).

Furthermore, the retransmission control unit 113 performs retransmission control on data to be received from the RF unit 120 in cooperation with the retransmission control unit 116. That is, the retransmission control unit 113 is notified of an ACK (Acknowledgement) indicating that data is normally received, or a NACK (Negative Acknowledgement) indicating that a bit error is detected, from the retransmission control unit 116. Then, the retransmission control unit 113 outputs a signal indicating an ACK or NACK to the LVDS driver 114.

The LVDS driver 114 converts data obtained from the retransmission control unit 113 into a DigRF packet, and transmits the packet to the RF unit 120. For example, the LVDS driver 114 adds, to data, CRC (Cyclic Redundancy Check) bits used for error detection. Furthermore, a header signal for determining the type of data may be added to data. Note that, the LVDS (Low Voltage Differential Signaling) is a short range digital wired transmission method, and is standardized as ANSI (American National Standards Institute)/TIA (Telecommunications Industry Association)/EIA (Electronic Industries Alliance)-644.

The LVDS receiver 115 receives the DigRF packet from the RF unit 120, and extracts data and CRC bits from the received DigRF packet. Then, the LVDS receiver 115 performs error detection by a CRC, and determines the presence or absence of a bit error in the data. The LVDS receiver 115 outputs the extracted data to the retransmission control unit 116.

The retransmission control unit 116 performs retransmission control on data (excluding the TAS command) to be transmitted to the RF unit 120 in cooperation with the retransmission control unit 113. That is, the retransmission control unit 116 obtains a signal indicating an ACK or NACK from the LVDS receiver 115, and notifies the retransmission control unit 113 of a retransmission request when obtaining the signal indicating a NACK.

Furthermore, the retransmission control unit 116 performs retransmission control on data to be received from the RF unit 120 in cooperation with the retransmission control unit 113. That is, the retransmission control unit 116 determines whether or not a bit error is detected about data extracted in the LVDS receiver 115. When a bit error is detected, the retransmission control unit 116 notifies the retransmission control unit 113 of a NACK. When a bit error is not detected, the retransmission control unit 116 notifies the retransmission control unit 113 of an ACK, and also, outputs the data to the demultiplexing unit 117.

The demultiplexing unit 117 demultiplexes the data obtained from the retransmission control unit 116 for each type of the data. In data received from the RF unit 120, I/Q data received from the base station 200, and an RF response indicating the state (for example, the state of Automatic Gain Control (AGC)) of the RF unit 120 are included. Particularly, a TPC bit as one of control information included in the I/Q data is output to the power control unit 111.

Figure 4:
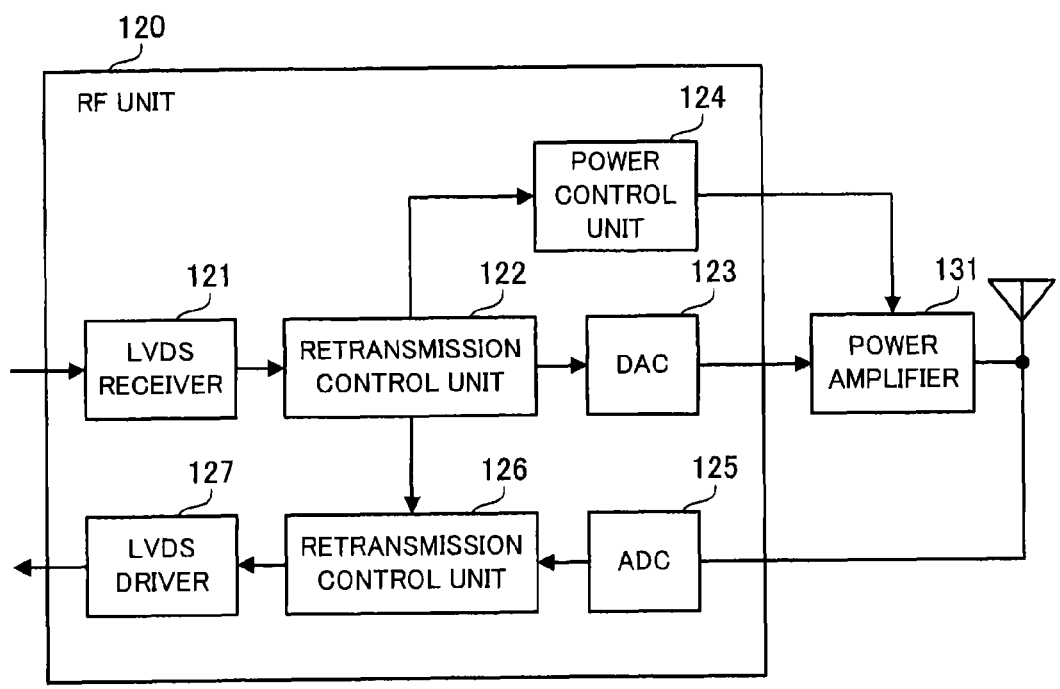
FIG. 4 is a block diagram illustrating an RF unit of the mobile station.

FIG. 4 is a block diagram illustrating an RF unit of the mobile station. The RF unit 120 is connected to a power amplifier 131 of the mobile station 100. The RF unit 120 includes an LVDS receiver 121, retransmission control units 122 and 126, a DAC (D/A Converter) 123, a power control unit 124, an ADC (A/D Converter) 125, and an LVDS driver 127.

The LVDS receiver 121 receives the DigRF packet from the baseband processing unit 110, and extracts data and CRC bits from the received DigRF packet. Then, The LVDS receiver 121 performs error detection by a CRC, and determines the presence or absence of a bit error in the data. The LVDS receiver 121 outputs the extracted data to the retransmission control unit 122.

The retransmission control unit 122 performs retransmission control on data to be received from the baseband processing unit 110 in cooperation with the retransmission control unit 126. That is, the retransmission control unit 122 determines whether or not a bit error is detected about data extracted in the LVDS receiver 121. When a bit error is detected, the retransmission control unit 122 notifies the retransmission control unit 126 of a NACK. When a bit error is not detected, the retransmission control unit 122 notifies the retransmission control unit 126 of an ACK.

However, the retransmission control unit 122 does not perform retransmission control on the TAS command. The retransmission control unit 122 uses any one of TAS commands normally received, of a plurality of (for example, two) TAS commands continuously received. The retransmission control unit 122 outputs the I/Q data to the DAC 123, and outputs the control data and TAS command to the power control unit 124. Note that, the type of data received from the baseband processing unit 110 may be determined based on, for example, a header signal of the DigRF packet or the content itself of the data.

Furthermore, the retransmission control unit 122 performs retransmission control on data to be transmitted to the baseband processing unit 110 in cooperation with the retransmission control unit 126. That is, the retransmission control unit 122 obtains a signal indicating an ACK or NACK from the LVDS receiver 121, and notifies the retransmission control unit 126 of a retransmission request when obtaining the signal indicating a NACK.

The DAC 123 converts, into an analog signal, a digital signal as the I/Q data obtained from the retransmission control unit 122. The analog signal output by the DAC 123 is amplified by the power amplifier 131, and is output from an antenna.

The power control unit 124 controls the transmission power of I/Q data based on the control data, and TAS command obtained from the retransmission control unit 122. Specifically, the power control unit 124 obtains control data indicating two candidates for transmission power corresponding to a TPC bit="Up", and a TPC bit="Down", and stores the data in a memory of the power control unit 124. Thereafter, the power control unit 124, when obtaining a TAS command indicating the determination result of the TPC bit, selects any one of the two candidates for transmission power indicated by the control data, and changes the setting of the power amplifier 131 so as to become the selected transmission power. For example, the power control unit 124 selects transmission power corresponding to "Up" when the TAS command=1, and selects transmission power corresponding to "Down" when the TAS command=0.

The ADC 125 converts an analog signal received from the base station 200 into a digital signal as the I/Q data, and outputs the I/Q data to the retransmission control unit 126.

The retransmission control unit 126 performs retransmission control on data to be transmitted to the baseband processing unit 110 in cooperation with the retransmission control unit 122. That is, the retransmission control unit 126 outputs data (including the I/Q data obtained from the ADC 125 and an RF response indicating the state of the RF unit 120) to the LVDS driver 127, and also stores the data in a buffer temporarily. Subsequently, the retransmission control unit 126, when notified of a retransmission request from the retransmission control unit 122, outputs the data stored in the buffer to the LVDS driver 127. In contrast, the retransmission control unit 126, when not notified of a retransmission request, processes the next data.

Furthermore, the retransmission control unit 126 performs retransmission control on data (excluding the TAS command) to be received from the baseband processing unit 110 in cooperation with the retransmission control unit 122. That is, the retransmission control unit 126 receives a notification of an ACK or NACK from the retransmission control unit 122, and outputs a signal indicating an ACK or NACK to the LVDS driver 127.

The LVDS driver 127 converts the data obtained from the retransmission control unit 126 into a DigRF packet, and transmits the packet to the baseband processing unit 110. For example, the LVDS driver 127 adds, to the data, CRC bits used for error detection. Furthermore, a header signal for determining the type of data may be added to the data.

Note that, the baseband processing unit 110 and the RF unit 120 may perform the transmission and reception of DigRF packets using two digital signal lines in which the transmission directions are different, or may perform the transmission and reception of DigRF packets using one digital signal line by time division. Furthermore, the baseband processing unit 110 and the RF unit 120 may transmit and receive I/Q data, control data, and a TAS command using the same digital signal line, or may transmit and receive I/Q data, control data, and a TAS command using different digital signal lines.

Figure 5:
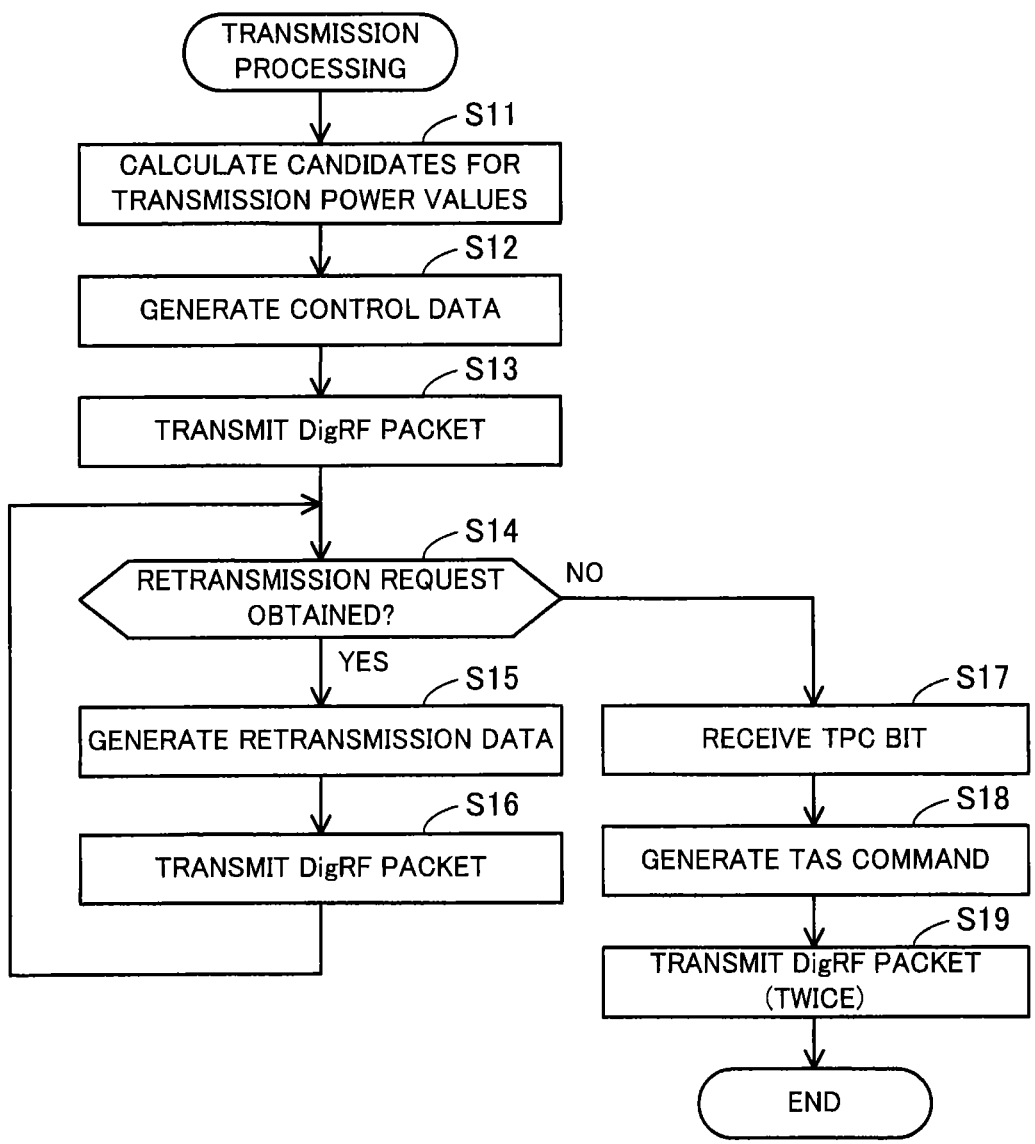
FIG. 5 is a flowchart illustrating transmission processing of the baseband processing unit.

FIG. 5 is a flowchart illustrating transmission processing of the baseband processing unit. This transmission processing is performed at, for example, a one-slot time (10 ms÷15) period of a radio frame. Processing illustrated in FIG. 5 will be described in order of step number.

(Step S11) The power control unit 111 calculates two candidates for transmission power values of a DPCCH corresponding to a TPC bit="Up", and a TPC bit="Down" based on the current transmission power value of the Dedicated Physical Control Channel (DPCCH) on the UL. Note that, the calculation of candidates for transmission power values is performed at a predetermined timing before receiving the TPC bit, in view of the timing of receiving the TPC bit from the base station 200.

(Step S12) The power control unit 111 generates control data indicating the two candidates for transmission power values of a DPCCH calculated in step S11. The retransmission control unit 113 stores the control data generated by the power control unit 111 in the buffer, and outputs the control data to the LVDS driver 114.

(Step S13) The LVDS driver 114 converts the control data obtained from the retransmission control unit 113 into a DigRF packet, and transmits the packet to the RF unit 120.

(Step S14) The retransmission control unit 116 obtains a signal of an ACK or NACK from the RF unit 120 about the control data transmitted in step S13, and notifies the retransmission control unit 113 of a retransmission request when obtaining the signal of a NACK. The retransmission control unit 113 determines whether or not having obtained the retransmission request. The retransmission control unit 113, when having obtained the retransmission request, advances the processing to step S15, and when not having obtained the retransmission request, advances the processing to step S17.

(Step S15) The retransmission control unit 116 generates retransmission data from the control data stored in the buffer in step S12, and outputs the retransmission data to the LVDS driver 114.

(Step S16) The LVDS driver 114 converts the retransmission data obtained from the retransmission control unit 113 into a DigRF packet, transmits the packet to the RF unit 120, and then advances the processing to step S14. Note that, the retransmission control unit 113 may place an upper limit on the number of times of retransmission processing in steps S14 to S16. For example, it is contemplated to limit retransmission processing to at most once. In that case, the power control unit 111 may determine the timing of calculating candidates for transmission power values in view of the upper limit number of times of retransmission processing. When not succeeding in the transmission of control data even if the upper limit number of times is reached, the retransmission control unit 113 reports transmission failure to the power control unit 111.

(Step S17) The LVDS receiver 115 and the retransmission control unit 116 receive the TPC bit via the RF unit 120 from the base station 200.

(Step S18) The power control unit 111 determines which of "Up" or "Down" the TPC bit received in step S17 indicates. Then, the power control unit 111 generates a TAS command in accordance with the determination result. For example, the power control unit 111 generates the TAS command=1 in the case of "Up", and generates the TAS command=0 in the case of "Down".

(Step S19) The retransmission control unit 113 outputs, to the LVDS driver 114, a plurality of times (for example, twice), the TAS command generated by the power control unit 111 in step S18. The LVDS driver 114 converts each of the plurality of TAS commands obtained from the retransmission control unit 113 into a DigRF packet, and transmits the packet to the RF unit 120.

Figure 6:
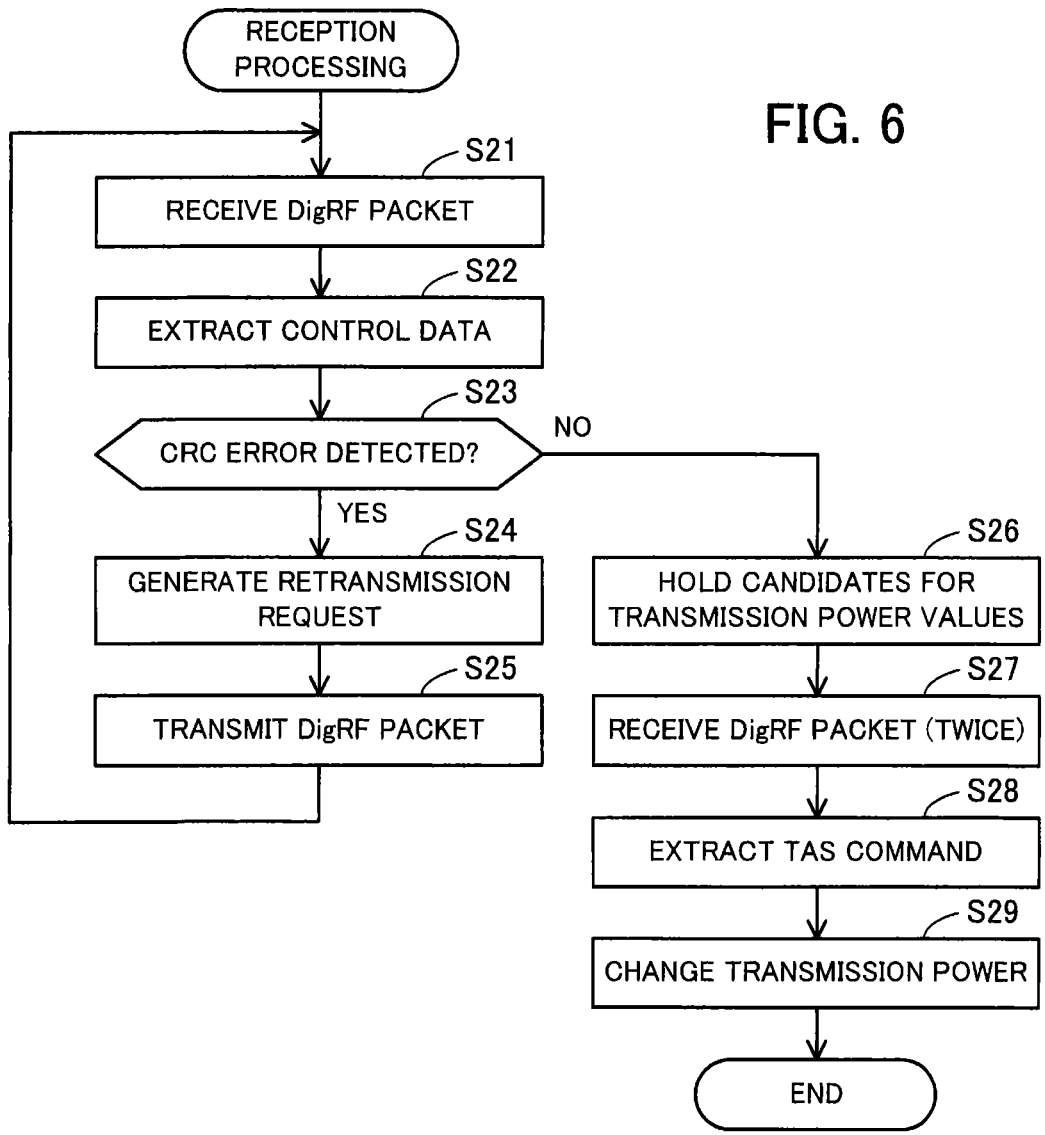
FIG. 6 is a flowchart illustrating reception processing of the RF unit.

FIG. 6 is a flowchart illustrating reception processing of the RF unit. This reception processing is performed at, for example, a one-slot time (10÷15 ms) period of a radio frame. Processing illustrated in FIG. 6 will be described in order of step number.

(Step S21) The LVDS receiver 121 receives the DigRF packet from the baseband processing unit 110.

(Step S22) The LVDS receiver 121 extracts control data indicating two candidates for transmission power values of a DPCCH from the DigRF packet received in step S21, and performs error detection by a CRC. Then, the LVDS receiver 121 outputs the control data to the retransmission control unit 122.

(Step S23) The retransmission control unit 122 determines whether or not a bit error (CRC error) is detected in the control data extracted in step S22. The retransmission control unit 122, when a CRC error is detected, advances the processing to step S24, and, when not detected, advances the processing to step S26.

(Step S24) The retransmission control unit 122 notifies the retransmission control unit 126 of a NACK about the control data extracted in step S22. The retransmission control unit 126 generates a signal indicating a NACK, and outputs the signal to the LVDS driver 127.

(Step S25) The LVDS driver 127 converts the signal indicating a NACK obtained from the retransmission control unit 126 into a DigRF packet, transmits the packet to the baseband processing unit 110, and then advances the processing to step S21. Note that, the retransmission control unit 122 may place an upper limit on the number of times of retransmission processing in steps S21 to S25.

(Step S26) The retransmission control unit 122 outputs the control data extracted in step S22 to the power control unit 124. The power control unit 124 stores, in the memory of the power control unit 124, the control data obtained from the retransmission control unit 122.

(Step S27) The LVDS receiver 121 receives continuously a plurality of times (for example, twice) the DigRF packet including the TAS command from the baseband processing unit 110.

(Step S28) The LVDS receiver 121 extracts the corresponding TAS command from each of the DigRF packets received in step S27, and outputs the command to the retransmission control unit 122.

(Step S29) The retransmission control unit 122 outputs the TAS command normally received to the power control unit 124. The power control unit 124 selects a transmission power value of a DPCCH based on the TAS command obtained from the retransmission control unit 122 and the control data stored in the memory in step S26. That is, the power control unit 124 selects any one of a transmission power value corresponding to the TPC bit="Up" and a transmission power value corresponding to the TPC bit="Down". Then, the power control unit 124 performs the setting of the power amplifier 131 so as to be adapted to the selected transmission power value.

Figure 7:
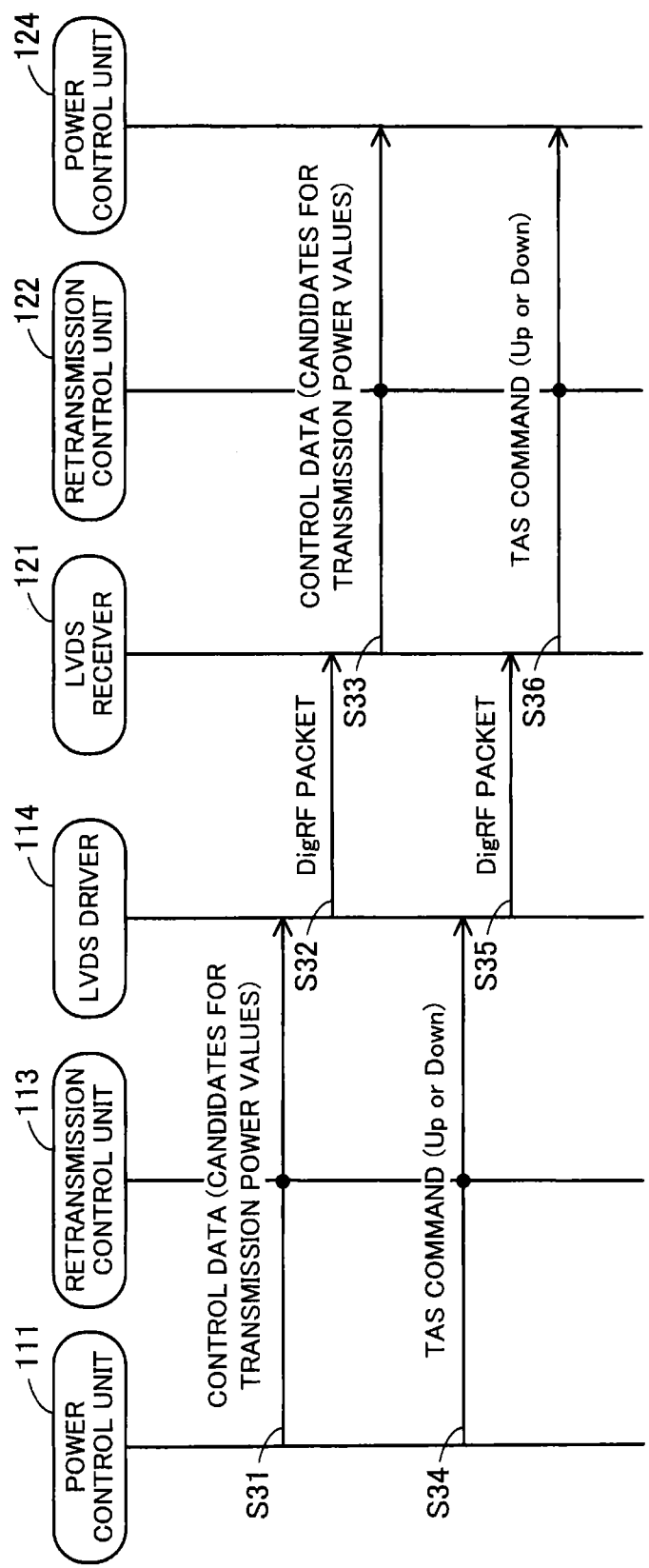
FIG. 7 is a sequence chart illustrating a first example of transmission power control.

FIG. 7 is a sequence chart illustrating a first example of transmission power control. This sequence example illustrates a case where the retransmission of control data does not occur between the baseband processing unit 110 and the RF unit 120. Processing illustrated in FIG. 7 will be described in order of step number.

(Step S31) The power control unit 111 generates, before receiving the TPC bit, control data indicating candidates for transmission power values corresponding to the TPC bit="Up", and the TPC bit="Down". The retransmission control unit 113 outputs the control data to the LVDS driver 114.

(Step S32) The LVDS driver 114 converts the control data into a DigRF packet, and transmits the packet to the LVDS receiver 121.

(Step S33) The LVDS receiver 121 receives the DigRF packet from the LVDS driver 114, and extracts the control data. The retransmission control unit 122 confirms that a CRC error is not detected, and outputs the control data to the power control unit 124. The power control unit 124 stores the control data in the memory.

(Step S34) The power control unit 111 determines which of "Up" or "Down" the TPC bit indicates after receiving the TPC bit, and generates a TAS command indicating the determination result. The retransmission control unit 113 outputs the TAS command to the LVDS driver 114.

(Step S35) The LVDS driver 114 converts the TAS command into a DigRF packet, and transmits the packet to the LVDS receiver 121.

(Step S36) The LVDS receiver 121 receives the DigRF packet from the LVDS driver 114, and extracts the TAS command. The retransmission control unit 122 outputs the TAS command to the power control unit 124. The power control unit 124 selects any one of the two transmission power values indicated by the control data based on the TAS command, and performs processing to change transmission power.

Figure 8:
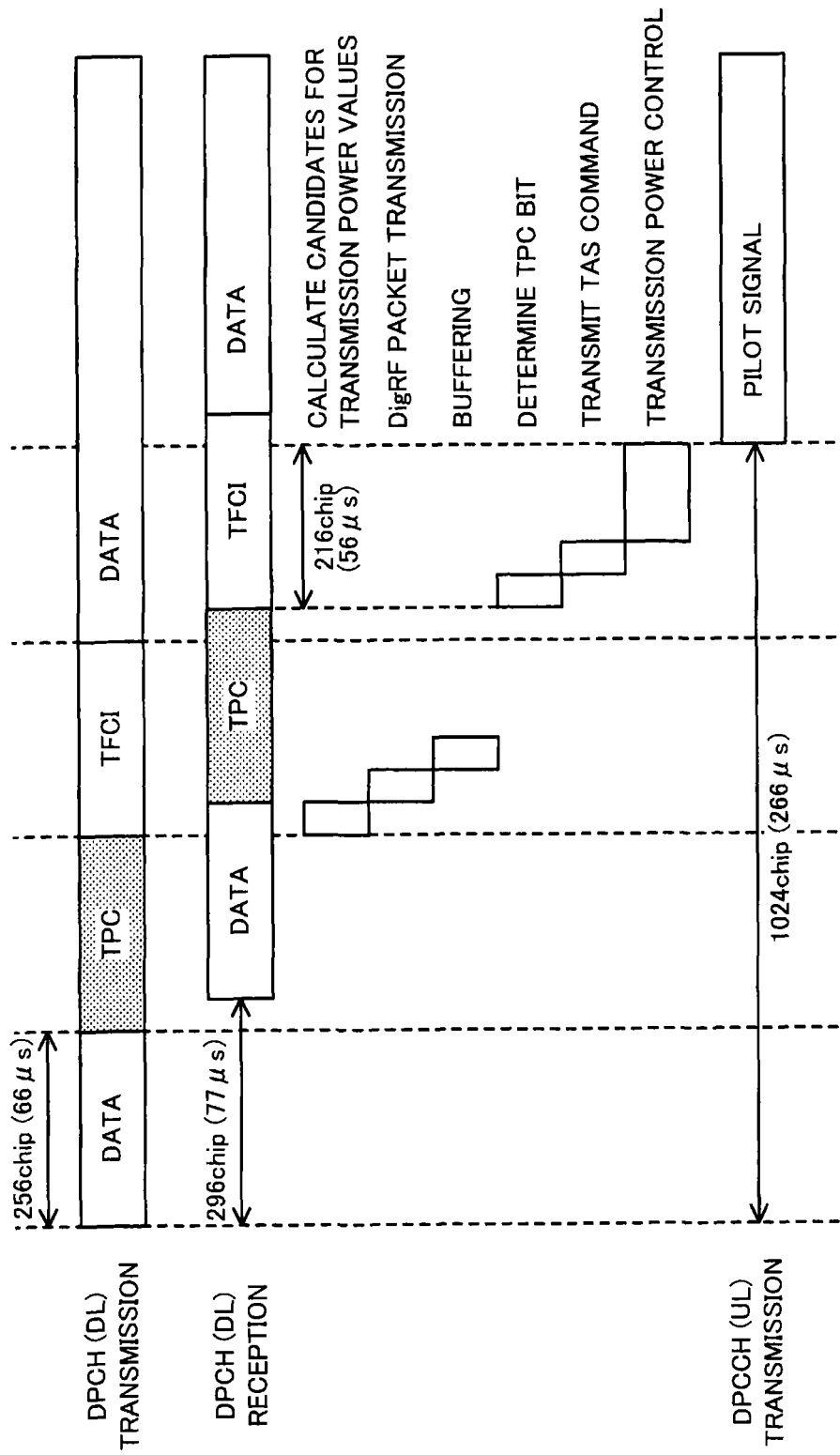
FIG. 8 is a timing chart illustrating the first example of transmission power control.

FIG. 8 is a timing chart illustrating the first example of transmission power control. A Dedicated Physical Data Channel (DPDCH) and a DPCCH are time-division multiplexed in a DPCH on the DL. A TPC bit transmitted by the DPCCH is mapped to the second symbol from the head of a slot of a 10÷15 ms period. Here, one symbol time is 256 chips (66 μs).

The base station 200 transmits the DPCH including the TPC bit in the second symbol to the mobile station 100. The mobile station 100 receives the DPCH with a delay of 296 chips (77 μs) at maximum from the transmission of the base station 200 in view of a soft handover. In contrast, the mobile station 100 reflects the TPC bit in the transmission power of a DPCCH on the UL after 1024 chips (266 μs) from the timing of transmitting the head of the DPCH. That is, the mobile station 100 reflects the TPC bit in the transmission power of the DPCCH on the UL after 216 chips (56 μs) from when the reception of the TPC bit is completed in the case that the reception of the DPCH is most delayed.

Therefore, the mobile station 100 starts preparation to change the transmission power of the DPCCH at a predetermined timing (a timing when the base station 200 finishes transmitting the second symbol of the DPCH, for example) irrespective of whether the reception of the TPC bit is completed or not. That is, at a predetermined timing, the baseband processing unit 110 calculates candidates for transmission power values, and transmits a DigRF packet including control data to the RF unit 120. The RF unit 120 buffers the received control data when a CRC error is not detected.

Subsequently, after completing reception of the TPC bit, the baseband processing unit 110 determines which of "Up" or "Down" the TPC bit is, and transmits a DigRF packet including a TAS command to the RF unit 120 twice. The RF unit 120 changes the transmission power of the DPCCH on the UL based on the received TAS command and the buffered control data. Hence, the mobile station 100 transmits the DPCCH with transmission power after change in good time after 1024 chips from the head of the DPCH on the DL.

Figure 9:
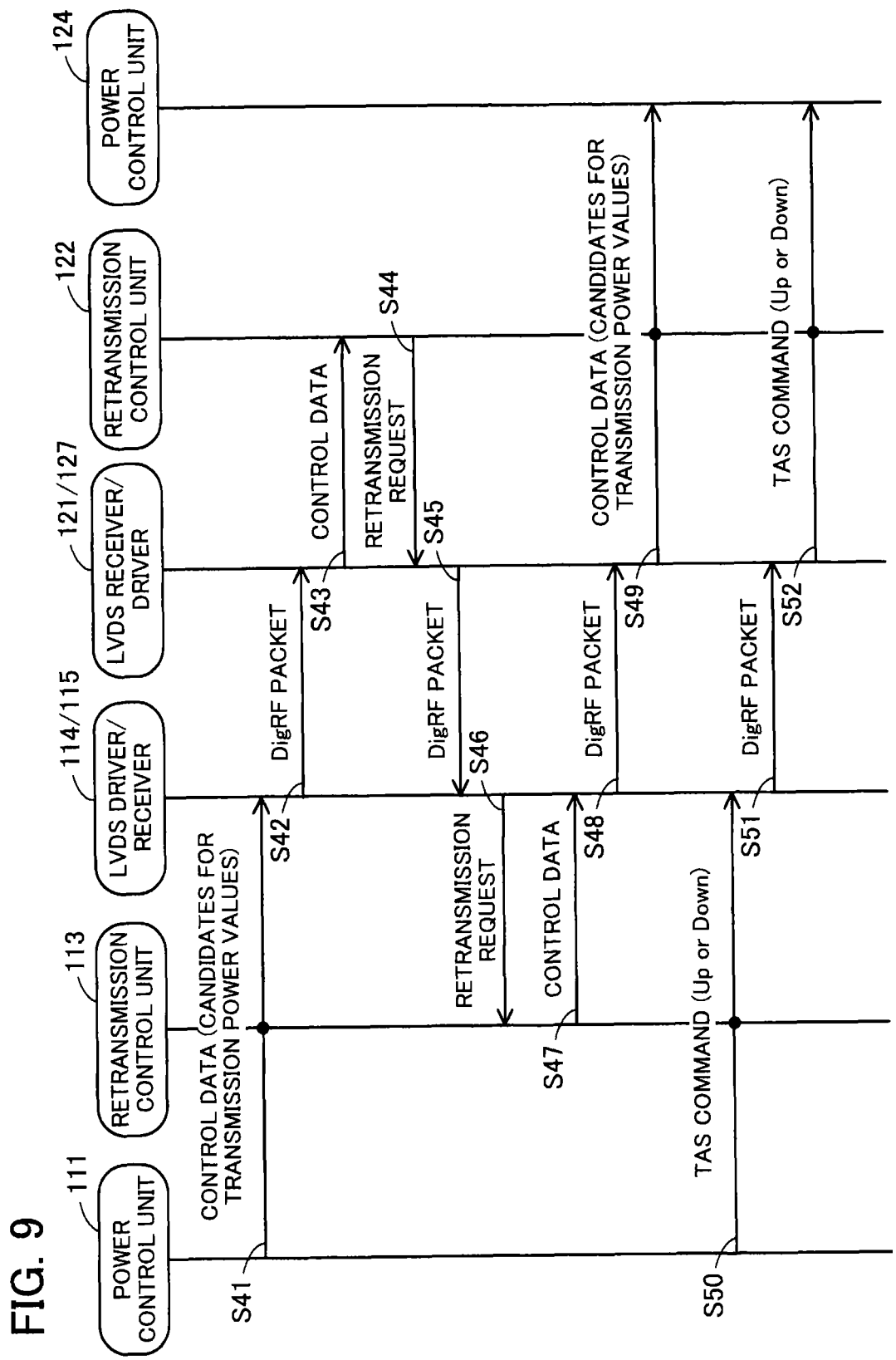
FIG. 9 is a sequence chart illustrating a second example of transmission power control.

FIG. 9 is a sequence chart illustrating a second example of transmission power control. This sequence example illustrates a case where the retransmission of control data occurs once between the baseband processing unit 110 and the RF unit 120. Processing illustrated in FIG. 9 will be described in order of step number.

(Step S41) The power control unit 111 generates, before receiving the TPC bit, control data indicating candidates for transmission power values corresponding to the TPC bit="Up", and the TPC bit="Down". The retransmission control unit 113 outputs the control data to the LVDS driver 114.

(Step S42) The LVDS driver 114 converts the control data into a DigRF packet, and transmits the packet to the LVDS receiver 121.

(Step S43) The LVDS receiver 121 receives the DigRF packet from the LVDS driver 114, and extracts the control data. The retransmission control unit 122 confirms that a CRC error is detected about the control data.

(Step S44) The retransmission control unit 122 notifies the retransmission control unit 126 of a NACK. The retransmission control unit 126 outputs a signal indicating a NACK (i.e., a signal indicating a retransmission request) to the LVDS driver 127.

(Step S45) The LVDS driver 127 converts the signal indicating a retransmission request into a DigRF packet, and transmits the packet to the LVDS receiver 115.

(Step S46) The LVDS receiver 115 receives the DigRF packet from the LVDS driver 127, extracts the signal indicating a retransmission request, and outputs the signal to the retransmission control unit 116. The retransmission control unit 116 notifies the retransmission control unit 113 of the retransmission request.

(Step S47) The retransmission control unit 113 outputs, as retransmission data, control data indicating candidates for transmission power values to the LVDS driver 114.

(Step S48) The LVDS driver 114 converts the control data into a DigRF packet, and transmits the packet to the LVDS receiver 121.

(Step S49) The LVDS receiver 121 receives the DigRF packet from the LVDS driver 114, and extracts the control data. The retransmission control unit 122 confirms that a CRC error is not detected, and outputs the control data to the power control unit 124. The power control unit 124 stores the control data in the memory.

(Step S50) The power control unit 111 determines which of "Up" or "Down" the TPC bit indicates after receiving the TPC bit, and generates a TAS command indicating the determination result. The retransmission control unit 113 outputs the TAS command to the LVDS driver 114.

(Step S51) The LVDS driver 114 converts the TAS command into a DigRF packet, and transmits the packet to the LVDS receiver 121.

(Step S52) The LVDS receiver 121 receives the DigRF packet from the LVDS driver 114, and extracts the TAS command. The retransmission control unit 122 outputs the TAS command to the power control unit 124. The power control unit 124 selects any one of the two transmission power values indicated by the control data based on the TAS command, and performs processing to change transmission power.

Figure 10:
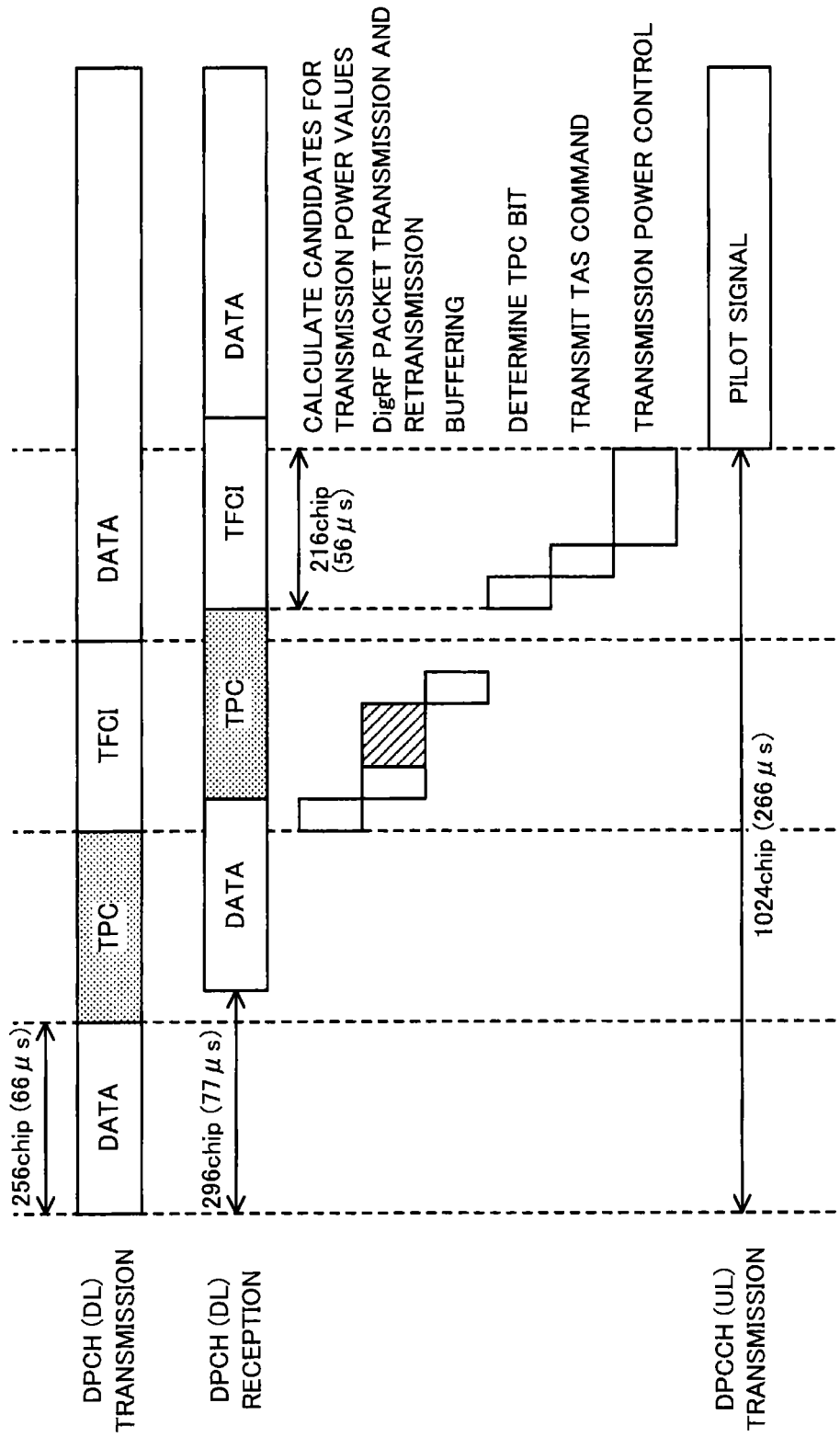
FIG. 10 is a timing chart illustrating the second example of transmission power control.

FIG. 10 is a timing chart illustrating the second example of transmission power control. The reception timing of a DPCH on the DL, the transmission timing of a DPCCH on the UL, and the timing to start preparation of changing the transmission power of the DPCCH are the same as those in FIG. 8.

At a predetermined timing (a timing when the base station 200 finishes transmitting the second symbol of a DPCH, for example), the baseband processing unit 110 calculates candidates for transmission power values, and transmits the DigRF packet including control data to the RF unit 120. When a CRC error is detected in the RF unit 120, the retransmission of control data is performed between the baseband processing unit 110 and the RF unit 120. Then, the RF unit 120 buffers the received control data.

Subsequently, after completing the reception of the TPC bit, the baseband processing unit 110 determines which of "Up" or "Down" the TPC bit is, and transmits a DigRF packet including a TAS command to the RF unit 120 twice. The retransmission control about the TAS command is not performed. The RF unit 120 changes the transmission power of a DPCCH on the UL based on the received TAS command and the buffered control data. Hence, the mobile station 100 transmits the DPCCH with transmission power after change in good time after 1024 chips from the head of the DPCH on the DL even if the retransmission of control data occurs.

Next, after waiting for the completion of receiving the TPC bit, an example of a mobile station that starts processing to change the transmission power of a DPCCH will be described. Hereinafter, in order to simplify an explanation, the operation of such a mobile station will be described by using reference numerals similar to those in FIGS. 3 and 4.

Figure 11:
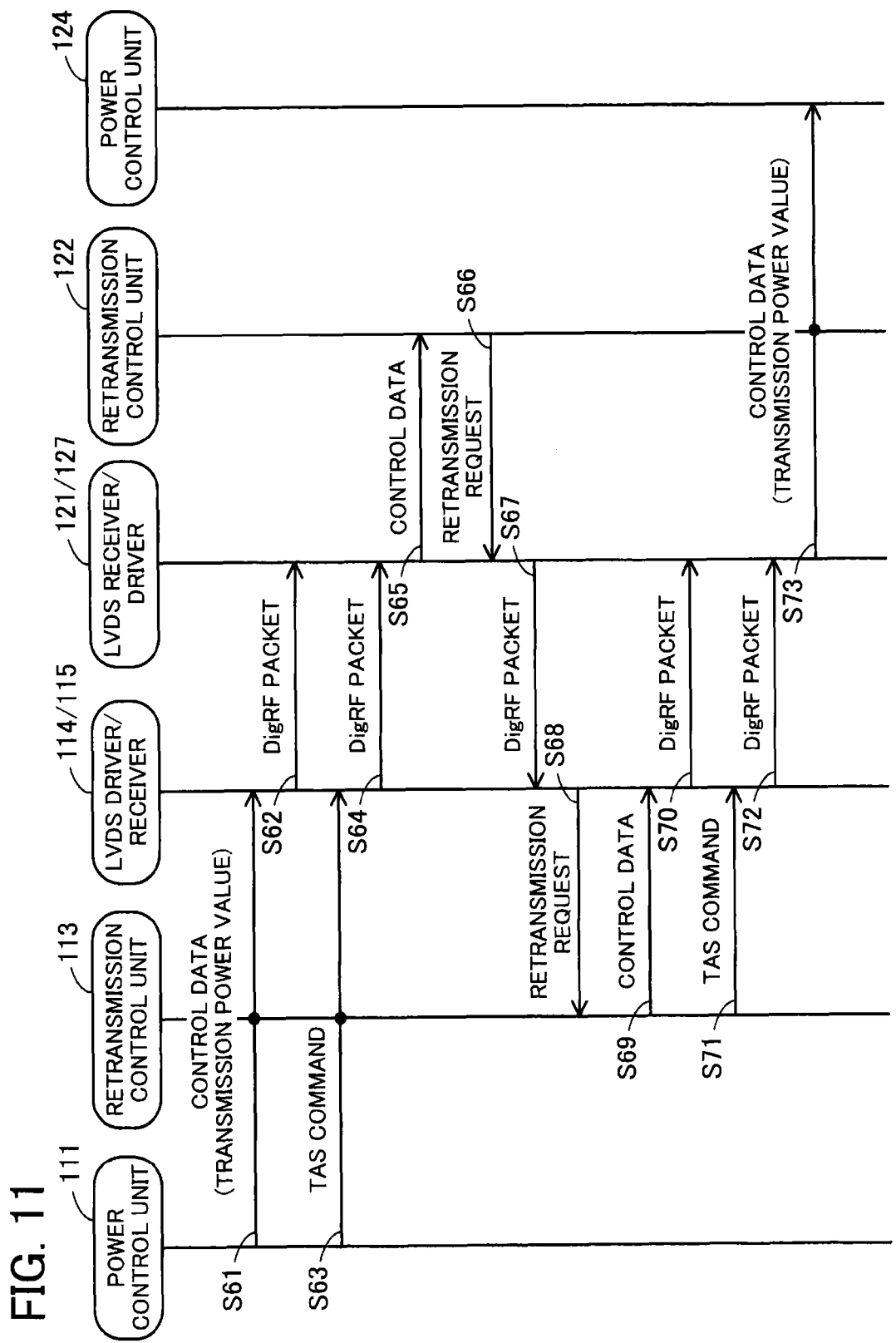
FIG. 11 is a sequence chart illustrating other example of transmission power control.

FIG. 11 is a sequence chart illustrating another example of transmission power control. This sequence example illustrates a case where the retransmission of control data occurs once between the baseband processing unit 110 and the RF unit 120. Processing illustrated in FIG. 11 will be described in order of step number.

(Step S61) The power control unit 111 determines which of "Up" or "Down" a TPC bit indicates after receiving the TPC bit, and calculates a transmission power value after change from the determination result and the current transmission power value. Then, the power control unit 111 generates control data indicating the calculated transmission power value. The retransmission control unit 113 outputs the control data to the LVDS driver 114.

(Step S62) The LVDS driver 114 converts the control data into a DigRF packet, and transmits the packet to the LVDS receiver 121.

(Step S63) The power control unit 111 generates a TAS command for giving an instruction to reflect the control data generated in step S61. The retransmission control unit 113 outputs the TAS command to the LVDS driver 114.

(Step S64) The LVDS driver 114 converts the TAS command into a DigRF packet, and transmits twice the packet to the LVDS receiver 121.

(Step S65) The LVDS receiver 121 receives the DigRF packet from the LVDS driver 114, and extracts the control data and the TAS command. The retransmission control unit 122 confirms that a CRC error is detected about the control data.

(Step S66) The retransmission control unit 122 notifies the retransmission control unit 126 of a NACK. The retransmission control unit 126 outputs a signal indicating a NACK (i.e., a signal indicating a retransmission request) to the LVDS driver 127. The retransmission control of the TAS command is not performed.

(Step S67) The LVDS driver 127 converts the signal indicating a retransmission request into a DigRF packet, and transmits the packet to the LVDS receiver 115.

(Step S68) The LVDS receiver 115 receives the DigRF packet from the LVDS driver 127, extracts the signal indicating a retransmission request, and outputs the signal to the retransmission control unit 116. The retransmission control unit 116 notifies the retransmission control unit 113 of the retransmission request.

(Step S69) The retransmission control unit 113 outputs, as retransmission data, control data indicating a transmission power value after change to the LVDS driver 114.

(Step S70) The LVDS driver 114 converts the control data into a DigRF packet, and transmits the packet to the LVDS receiver 121.

(Step S71) The retransmission control unit 113 outputs a TAS command corresponding to the control data that is the retransmission data to the LVDS driver 114.

(Step S72) The LVDS driver 114 converts the TAS command into a DigRF packet, and transmits twice the packet to the LVDS receiver 121.

(Step S73) The LVDS receiver 121 receives the DigRF packet from the LVDS driver 114, and extracts the control data and the TAS command. The retransmission control unit 122 confirms that a CRC error is not detected about the control data, and outputs the control data to the power control unit 124. The power control unit 124 performs processing to change transmission power so as to become the transmission power value indicated by the control data.

Figure 12:
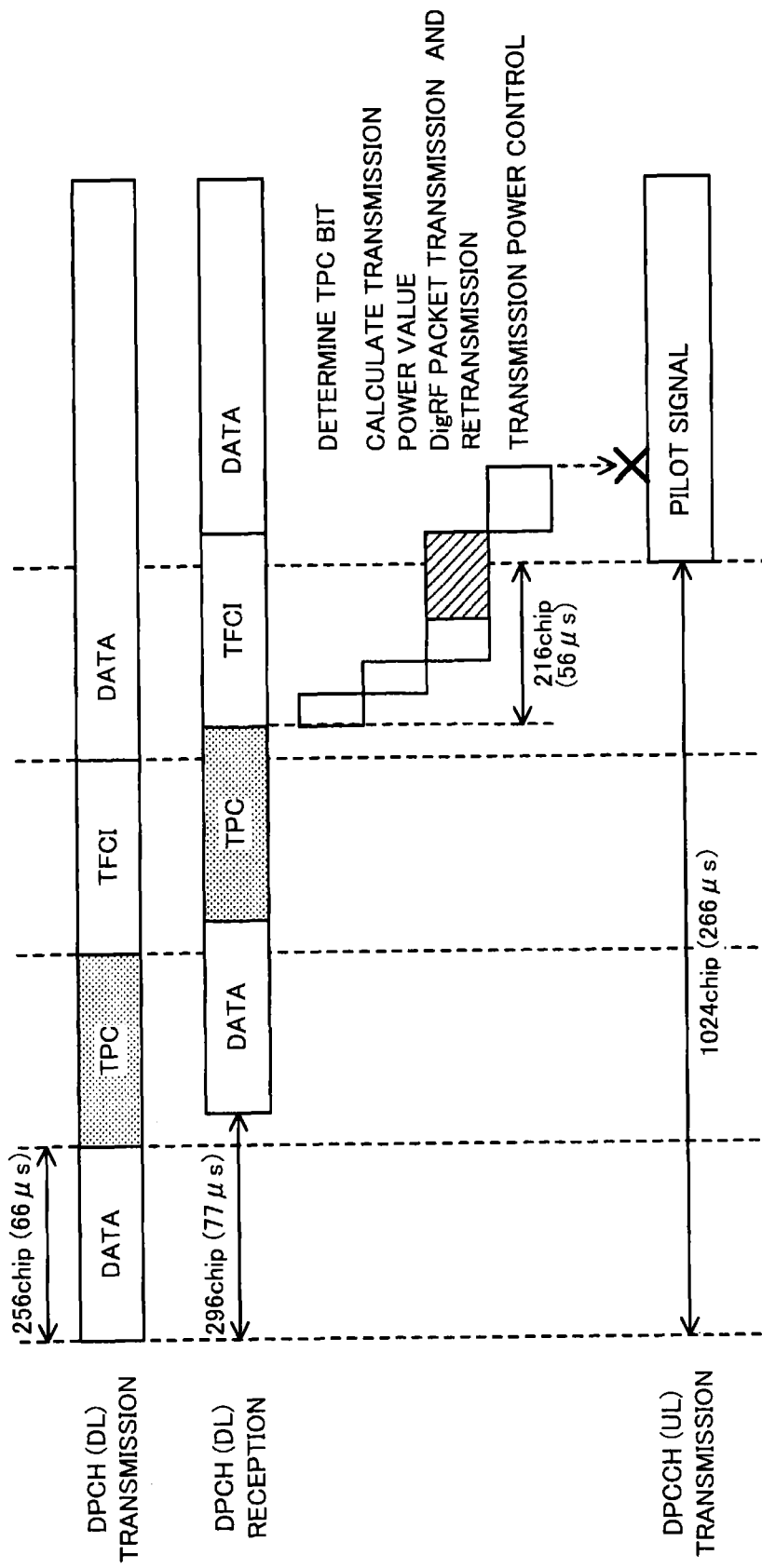
FIG. 12 is a timing chart illustrating the other example of transmission power control.

FIG. 12 is a timing chart illustrating the other example of transmission power control. The reception timing of a DPCH on the DL, and the transmission timing of a DPCCH on the UL are the same as those in FIGS. 8 and 10. In contrast, the timing to start preparation of changing the transmission power of the DPCCH is different from those in FIGS. 8 and 10.

After completing the reception of the TPC bit transmitted by the second symbol of a DPCH, the baseband processing unit 110 determines which of "Up" or "Down" the TPC bit is. Then, the baseband processing unit 110 calculates a transmission power value after reflecting the TPC bit, and transmits a DigRF packet including control data to the RF unit 120. When a CRC error is detected in the RF unit 120, the retransmission of control data is performed between the baseband processing unit 110 and the RF unit 120. Subsequently, the RF unit 120, when normally receiving the control data, tries to change the transmission power of a DPCCH.

However, not less than 1024 chips from the head of the DPCH on the DL has already passed at the point when the preparation of change in transmission power is completed, and there is a possibility of failure in change in transmission power. In that case, the mobile station 100 waits for the next slot to perform change in transmission power, and a blank period of control is caused by one slot (10÷15 ms). In this way, failure in transmission power control may occur in a method of transmitting control data after waiting for the reception of a TPC bit.

According to the mobile station 100 of such a second embodiment, the mobile station 100 starts to transmit control data from the baseband processing unit 110 to the radio unit 120 before receiving a TPC bit. Furthermore, the mobile station 100 notifies rapidly the radio unit 120 of a determination result of the TPC bit from the baseband processing unit 110 by continuously transmitting a plurality of times a TAS command whose retransmission control is not performed, after receiving the TPC bit. Hence, even when the retransmission of control data may occur, it is possible to suppress delay in transmission power control, and it becomes easy to comply with specifications of radio communication.

Note that, in the second embodiment, although an example is described in which the baseband processing unit 110 instructs the RF unit 120 to change transmission power based on a TPC bit, the above-mentioned method of transmitting control data and a TAS command is also used for other than change in transmission power. That is, when the baseband processing unit 110 requests the RF unit 120 to perform processing based on control information on radio communication, the above-mentioned method of transmitting control data and a TAS command may be used. Furthermore, the baseband processing unit 110 and the radio unit 120 are also distributed respectively in a state of being incorporated into the mobile station 100, or are also distributed as independent parts.

The above indicates simply the principle of the invention. Furthermore, numerous modifications and changes will occur to those skilled in the art, the invention is not limited to the exact configuration and application examples illustrated and described above, and all corresponding modifications and equivalents are regarded as the scope of the invention corresponding to the appended claims and their equivalents.

According to the above-mentioned radio communication apparatus, baseband processing apparatus, and radio apparatus, the delay from when control information on radio communication is obtained, until processing in accordance with the control information is performed is suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication apparatus comprising:
   a radio unit; and
   a baseband processing unit that obtains control information on radio communication, and instructs the radio unit to perform processing in accordance with the control information, wherein
   the baseband processing unit includes:
   a first control unit that generates first data indicating a plurality of candidates for instructions corresponding to a plurality of values to be taken by the control information, and generates second data for identifying the instruction corresponding to the value of the obtained control information, of the plurality of candidates for instructions; and
   a transmission unit that transmits the first data to the radio unit before obtaining the control information, and transmits the second data to the radio unit after obtaining the control information, and wherein
   the radio unit includes:
   a reception unit that receives the first and second data from the baseband processing unit; and
   a second control unit that performs processing in accordance with the instruction identified by the received second data, of the plurality of candidates for instructions indicated by the received first data.

2. The radio communication apparatus according to claim 1, wherein the transmission unit transmits the first data as data on which retransmission control is performed between the transmission unit and the reception unit, and transmits the second data as data on which retransmission control is not performed.

3. The radio communication apparatus according to claim 1, wherein the transmission unit transmits the second data a plurality of times to the radio unit without waiting for a retransmission request from the radio unit.

4. The radio communication apparatus according to claim 1, wherein
   the plurality of candidates for instructions each is an instruction to change a state of the radio unit, and
   the first control unit calculates a plurality of candidates for states after change of the radio unit from a current state of the radio unit and the plurality of values to be taken by the control information, and generates the first data.

5. The radio communication apparatus according to claim 1, wherein
   the control information is information on change in transmission power, and
   the plurality of candidates for instructions each is an instruction to change transmission power of the radio unit.

6. A baseband processing apparatus connected to a radio apparatus to obtain control information on radio communication and instructing the radio apparatus to perform processing in accordance with the control information, the baseband processing unit comprising:
   a control unit that generates first data indicating a plurality of candidates for instructions corresponding to a plurality of values to be taken by the control information, and generates second data for identifying the instruction corresponding to the value of the obtained control information of the plurality of candidates for instructions; and
   a transmission unit that transmits the first data to the radio apparatus before obtaining the control information, and transmits the second data to the radio apparatus after obtaining the control information.

7. A radio apparatus connected to a baseband processing apparatus that obtains control information on radio communication and gives an instruction of processing in accordance with the control information, the radio apparatus comprising:
   a reception unit that receives, from the baseband processing apparatus, first data indicating a plurality of candidates for instructions corresponding to a plurality of values to be taken by the control information before obtaining the control data, and receives, from the baseband processing apparatus, second data for identifying the instruction corresponding to the value of the obtained control information of the plurality of candidates for instructions after obtaining the control information; and
   a control unit that performs processing in accordance with the instruction identified by the received second data of the plurality of candidates for instructions indicated by the received first data.

* * * * *